(12) United States Patent
Seethaler et al.

(10) Patent No.: US 12,093,211 B2
(45) Date of Patent: Sep. 17, 2024

(54) SYSTEM SETTING ADJUSTMENT BASED ON LOCATION

(71) Applicant: Lenovo (Singapore) Pte. Ltd., Singapore (SG)

(72) Inventors: Kenneth Seethaler, Raleigh, NC (US); Philip J Jakes, Durham, NC (US); Adam Cavenaugh, Cary, NC (US); Tin-Lup Wong, Chapel Hill, NC (US); Koji Kawakita, Yokohama (JP); David Douglas, Cary, NC (US); Kazuo Fujii, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 115 days.

(21) Appl. No.: 17/557,416

(22) Filed: Dec. 21, 2021

(65) Prior Publication Data
US 2023/0195687 A1 Jun. 22, 2023

(51) Int. Cl.
*G06F 15/78* (2006.01)
(52) U.S. Cl.
CPC .............. *G06F 15/7882* (2013.01)

(58) Field of Classification Search
CPC .................................................. G06F 15/7882
See application file for complete search history.

(56) References Cited

U.S. PATENT DOCUMENTS

| | | | |
|---|---|---|---|
| 10,834,498 B2 | 11/2020 | Kapinos et al. | |
| 11,077,958 B1 * | 8/2021 | Letsu-Dake | ......... G08G 5/0021 |
| 2014/0342714 A1 * | 11/2014 | Sanders | ................. H04W 4/021 |
| | | | 455/418 |
| 2021/0370836 A1 | 12/2021 | Xu et al. | |

* cited by examiner

*Primary Examiner* — Stefan Stoynov
(74) *Attorney, Agent, or Firm* — FERENCE & ASSOCIATES LLC

(57) ABSTRACT

One embodiment provides a method, including: identifying, based on context data, a location of an information handling device; accessing a settings profile for the information handling device that is based on the identified location; determining, using a processor, whether at least one current setting on the information handling device is inconsistent with the settings profile; and adjusting, responsive to determining that the at least one current setting is inconsistent with the settings profile, the at least one current setting to match the settings profile for the location. Other aspects are described and claimed.

16 Claims, 3 Drawing Sheets

SYSTEM SETTING ADJUSTMENT BASED ON LOCATION

BACKGROUND

Individuals may interact with their information handling devices ("devices"), for example smart phones, tablet devices, hybrid devices, laptops, and the like, in a variety of different locations. For example, an individual may perform work-related tasks on a single device in multiple locations (e.g., while at their job, while at home, while in a public location, etc.). Individuals may prefer to have specific system settings active on their device based upon the location that they are in.

BRIEF SUMMARY

In summary, one aspect provides a method, including: identifying, based on context data, a location of an information handling device; accessing a settings profile for the information handling device that is based on the identified location; determining, using a processor, whether at least one current setting on the information handling device is inconsistent with the settings profile; and adjusting, responsive to determining that the at least one current setting is inconsistent with the settings profile, the at least one current setting to match the settings profile for the location.

Another aspect provides an information handling device, including: a processor; a memory device that stores instructions executable by the processor to: identify, based on context data, a location of the information handling device; access a settings profile for the information handling device that is based on the identified location; determine whether at least one current setting on the information handling device is inconsistent with the settings profile; and adjust, responsive to determining that the at least one current setting is inconsistent with the settings profile, the at least one current setting to match the settings profile for the location.

A further aspect provides a product, including: a storage device that stores code, the code being executable by a processor and comprising: code that identifies, based on context data, a location of an information handling device; code that accesses a setting profile for the information handling device that is based on the identified location; code that determines whether at least one current setting on the information handling device is inconsistent with the settings profile; and code that adjusts, responsive to determining that the at least one current setting is inconsistent with the settings profile, the at least one current setting to match the settings profile for the location.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
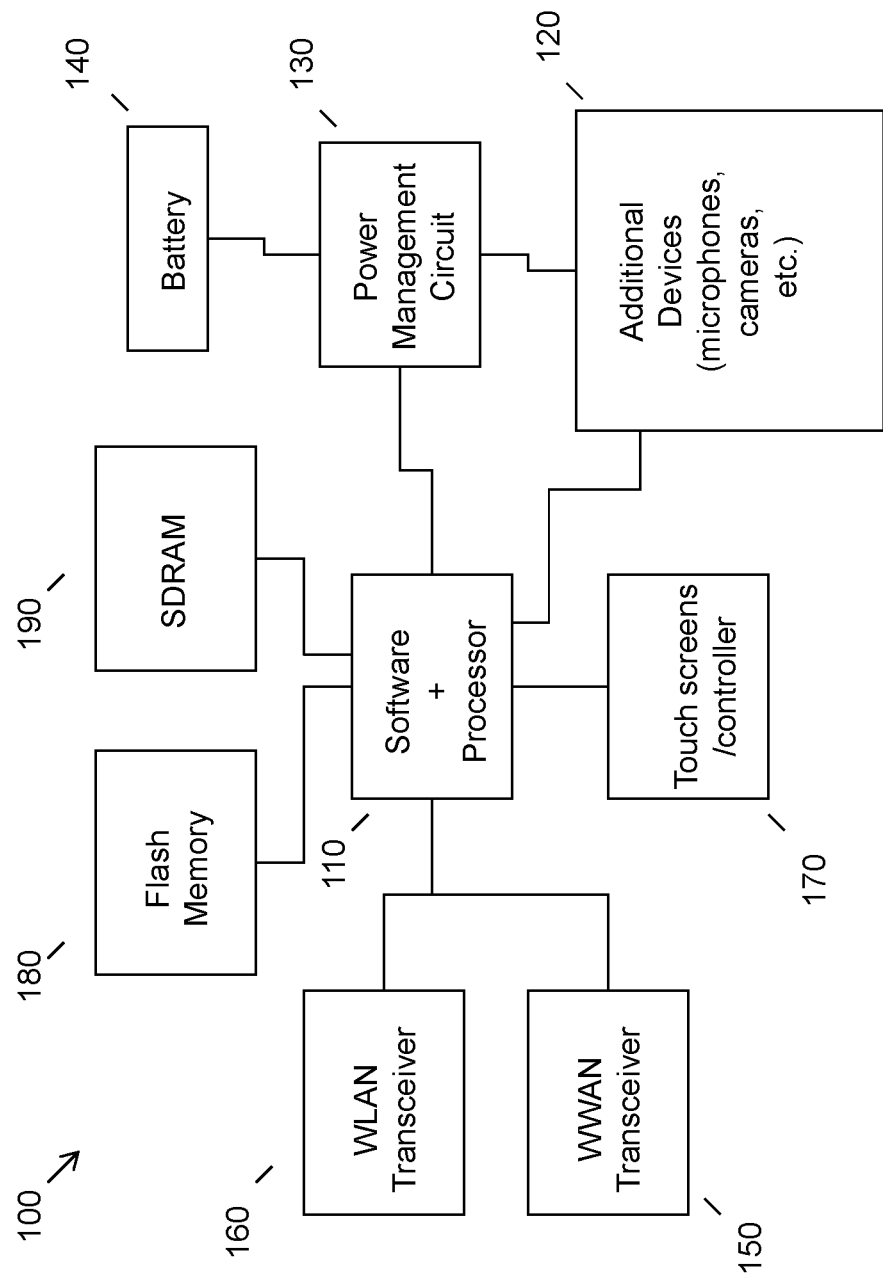
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Individuals frequently experience performance issues with integrated or peripheral input devices. For example, individuals that utilize a trackpad on a laptop to navigate around a display often complain that it is difficult to move the cursor large distances with ease (i.e., multiple swiping motions are often required before the cursor is moved to the desired location). Individuals utilizing a mouse may experience similar issues, especially if the surface the mouse is utilized on is suboptimal (e.g., a glass surface, a textured surface, an uneven surface, etc.).

Users may prefer to have specific system settings active on their device based upon the location that they are in. For instance, a user may prefer to have a digital privacy filter active on their screen while they are operating their device in public but not while operating their device at home or at work. As another example, a user may prefer to operate their device in low power mode while traveling but not while close to a power source. In yet another example, a user may prefer to have a narrow microphone beam (i.e., that may pick up less ambient sound) in a busy/loud environment than in a quiet room.

At present, a user has to manually make changes to their system settings each time they change locations. Such a process may be burdensome, especially if a user is unfamiliar with the setting adjustment process. Additionally, not all settings can be adjusted from a single location. Consequently, a user may need to navigate through a multitude of setting menus to achieve their preferred system settings, which may be time-consuming.

Accordingly, an embodiment provides a method for dynamically adjusting system settings for a device based upon an identified location. In an embodiment, a location of a device may be identified by analyzing context data available to the device. An embodiment may then access a settings profile for the device that is associated with the identified location. Thereafter, an embodiment may determine whether one or more current system settings are inconsistent with the settings in the settings profile. Responsive to determining that one or more current system settings are inconsistent with the settings in the settings profile, an embodiment may automatically, without any additional user input, adjust those settings to match the settings in the settings profile. Such a method may ensure that a user's device is always operating under optimal, or user-preferred, system settings based upon the location that it is in.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
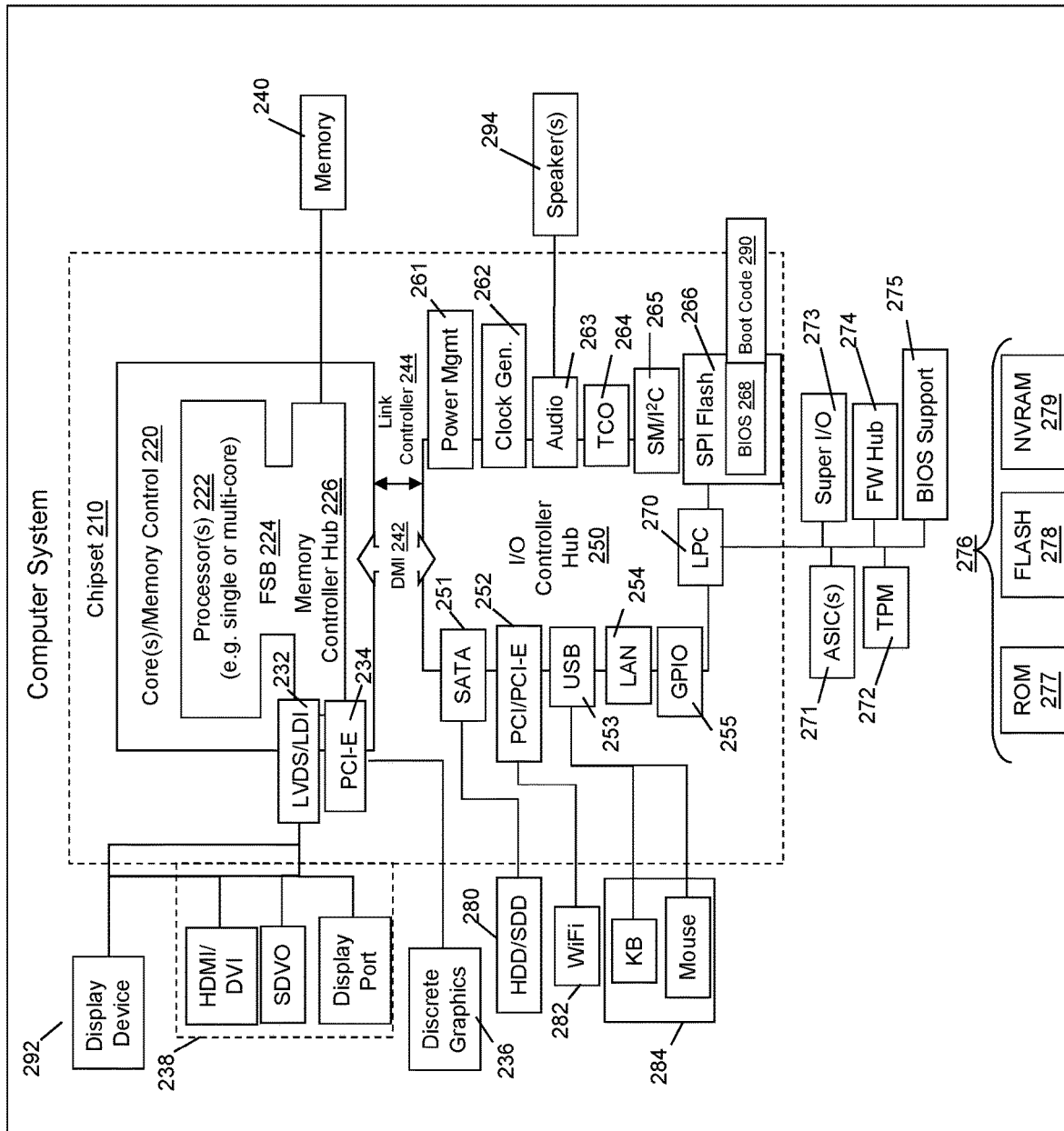
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of enabling a user to adjust their system settings. For example, the circuitry outlined in FIG. 1 may be implemented in a smart phone, whereas the circuitry outlined in FIG. 2 may be implemented in a personal computer embodiment.

Figure 3:
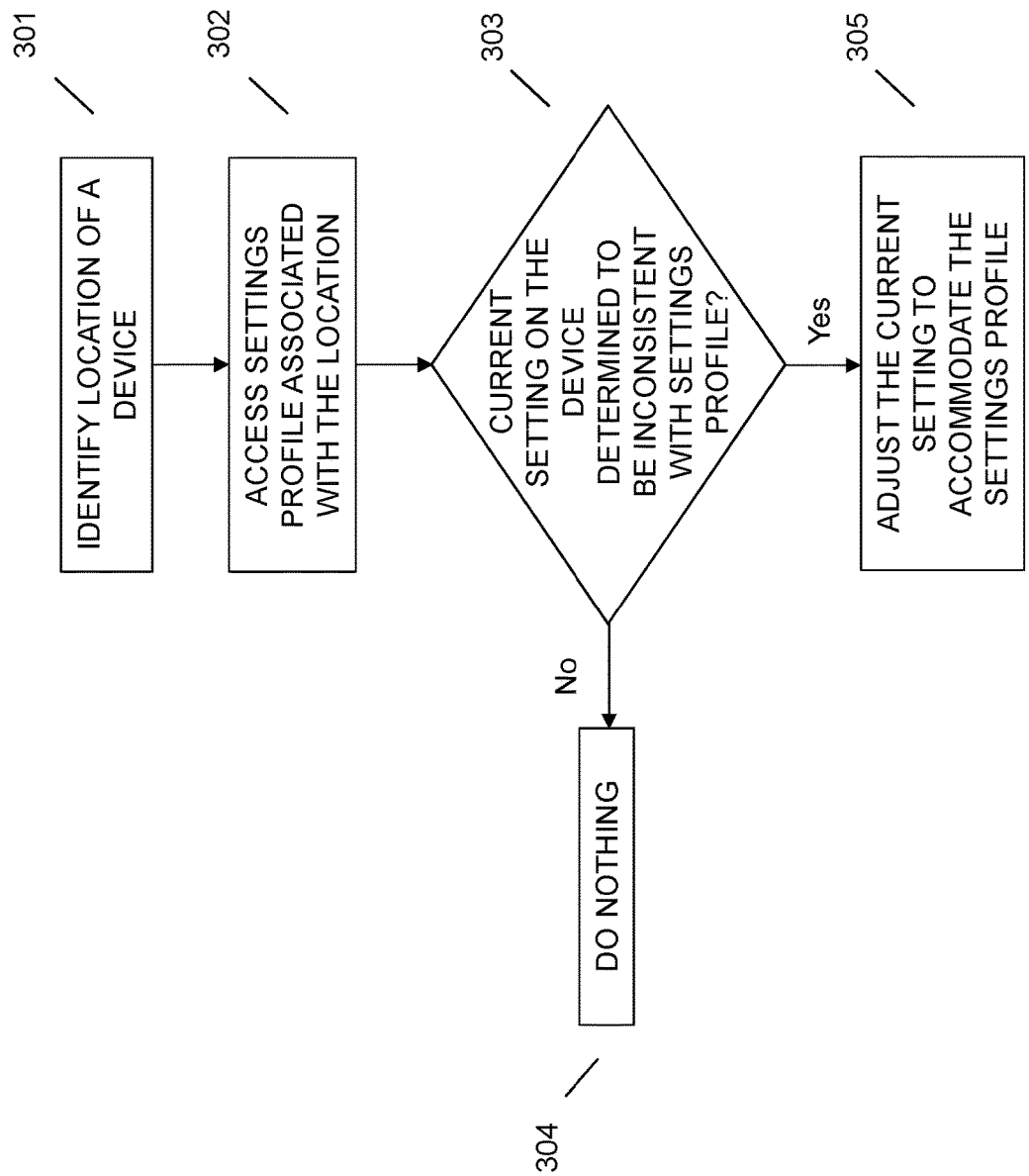
FIG. 3 illustrates an example method of dynamically adjusting one or more system settings based upon an identified location of a device.

Referring now to FIG. 3, an embodiment may automatically adjust one or more system settings based upon an identified location. At 301, an embodiment may identify a location of a device. The identification may be facilitated by analyzing one or more pieces of context data available to the device. In an embodiment, the context data may correspond to image data (e.g., images or videos captured of a device's location, etc.), audio data (e.g., audio data captured in the device's location and/or audio data that provides an indication where a device will be located at a particular time, etc.), device position data (e.g., global positioning system (GPS) data, Wi-Fi positioning data, etc.), calendar data (e.g., scheduled appointments, meetings, or events that may provide an indication of where the device is located at a particular time, etc.), communication data (e.g., voice mails, e-mails, text messages, social media messages, etc. that may provide an indication of where the device is located at a particular time, etc.), and the like.

In an embodiment, the context data may be accessed or obtained through various means. For instance, a user may enable one or more permissions on a device for a system to access context data associated with their personal information (e.g., communication data, calendar data, note data, etc.). Additionally or alternatively, one or more sensors (e.g., a camera sensor, a microphone, a receiver, etc.) may be utilized to capture data associated with a device's location. As a non-limiting example, an embodiment may capture one or more images (e.g., using a front-view camera, a world-view camera, a combination thereof, etc.) of a scene. These images may then be analyzed (e.g., using one or more conventional image analysis techniques known in the art, etc.) and compared to one or more known images (e.g., stored in a database, readily accessible online, etc.) to attempt to determine the location of the device.

At 302, an embodiment may access a settings profile that is optimized for the identified location of the device. In an embodiment, the settings profile may contain indications of one or more settings that are designated to be active when the device is in a particular location (e.g., at home, at work, in a public location, in a quiet environment, in a loud environment, etc.). In an embodiment, the settings profile may be stored in an accessible storage location (e.g., a database stored locally on the device or remotely on another device or server, etc.).

In an embodiment, the settings profile may originally be a default profile (i.e., a profile that contains different default settings for different locations) established by a manufacturer of the device that may later be adjusted by a user. Alternatively, a user may establish the entire settings profile from scratch (i.e., by identifying the specific settings they want active for each designated location). Additionally or alternatively, at least a portion of the settings profile may be dynamically established by a system of the device. More particularly, an embodiment may store historical user interactions with the device and establish certain settings for particular locations based on analysis of these historical device interactions. For example, an embodiment may identify that each time a device transitions to a public place a digital privacy filter is activated by a user (i.e., a filter that makes displayed content difficult to view by secondary or "over-the-shoulder" viewers). Accordingly, an embodiment may identify that once this user action has been performed a predetermined number of times, or a predetermined number of times within a predetermined period of time, an embodiment may thereafter proceed to automatically initiate the digital privacy filter upon recognition that the device has transitioned to a public space. Additionally or alternatively to the foregoing, in an embodiment, multiple users may access and use a single device. In such a situation, multiple settings profiles may exist based upon the identity of the current user.

At 303, an embodiment may determine whether at least one current setting on the device is inconsistent with the settings in the settings profile. In an embodiment, the determination may be facilitated by first identifying, by consulting system logic, the settings active on the device. An embodiment may then compare the currently active system settings to the settings in the settings profile to determine if an inconsistency exists. Responsive to determining, at 303, that there is no inconsistency between the current settings and the settings profile for the identified location, an embodiment may, at 304, take no additional action. Conversely, responsive to determining, at 305, that an inconsistency exists between at least one current setting and the settings profile, an embodiment may, at 306, adjust the inconsistent setting to the match the settings profile for the location.

In an embodiment, the adjustment may occur automatically without the receipt of any additional user input. In an embodiment, each inconsistent setting may be adjusted to match the settings profile. More particularly, an embodiment may adjust a single device setting or multiple device settings. In an embodiment, virtually any device setting may be included within a settings profile set and virtually any device setting may be adjusted to match the settings profile. For instance, non-limiting examples of settings that may be adjusted to match a settings profile include a microphone beamforming setting, a display brightness setting, a power consumption setting, a content privacy setting, a login setting, combinations thereof, and the like.

In an embodiment, the adjustment of a system setting may occur only if certain characteristics are present in the identified location. The characteristics may correspond to particular people or objects and/or numbers associated therewith present in the location, lighting conditions of the location, weather conditions in the location, distance of the location to another location (e.g., distance from home, etc.), and the like. As a non-limiting example, an embodiment may identify a settings profile for a public location with a ruleset that specifies that a digital privacy filter should be activated on the device only responsive to identifying that more than a predetermined number of individuals are present in that public location.

In an embodiment, if a system dynamically adjusts one or more system settings to match a settings profile and the user does not like this adjustment the user may provide modification input. Modification input may be provided to the device using one or more conventional input means (e.g., voice input, touch input, stylus input, keyboard input, combinations thereof, etc.) that may correspondingly be captured by one or more input devices (e.g., a microphone, a touch-sensitive display, a keyboard, etc.). Responsive to receiving the modification input, an embodiment may revert the adjusted setting back to its unadjusted state. Additionally or alternatively, responsive to receiving this modification input an embodiment may dynamically update the settings profile. For example, an embodiment may to note to not adjust the adjusted setting in the settings profile for the location.

The various embodiments described herein thus represent a technical improvement to conventional methods for adjusting system settings on a device. Using the techniques described herein, an embodiment may identify a location of a device and access a settings profile for the device based on the identified location. An embodiment may then determine whether one or more settings on the device are inconsistent with the settings profile for the location. Responsive to determining that at least one device setting is inconsistent with the settings profile, an embodiment may automatically adjust the inconsistent setting to match the settings profile. Such a method may ensure that a device is always operating at user-desired settings in each use location.

Additional details regarding the above discussed embodiments can be found in co-pending and commonly assigned U.S. patent application Ser. No. 17/557,422: "MICROPHONE SETTING ADJUSTMENT BASED ON LOCATION" which is filed concurrently herewith and incorporated by reference herein as if fully set forth herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, based on context data, a location of an information handling device, wherein the location has a corresponding attribute;
   accessing a settings profile for the information handling device that is based on the identified location, wherein at least a portion of the settings profile is dynamically established based upon historical user setting adjustment data for locations other than the identified location and analysis of the historical user setting adjustment data in view of the identified location, wherein dynamically establishing the at least a portion of the settings profile comprises identifying a user action has been performed a predetermined number of times at locations having the corresponding attribute other than the identified location;
   determining, using a processor, whether at least one current setting on the information handling device is inconsistent with the settings profile; and
   adjusting, responsive to determining that the at least one current setting is inconsistent with the settings profile, the at least one current setting to match the settings profile for the location, wherein the adjusting comprises automatically adjusting without receipt of additional user input.

2. The method of claim 1, wherein the identifying the location comprises identifying the location using at least one sensor selected from the group consisting of a camera sensor, a microphone, a receiver, and combinations thereof.

3. The method of claim 1, wherein the context data is at least one article of data selected from the group consisting of image data, audio data, GPS data, calendar data, communication data, and network data.

4. The method of claim 1, wherein the at least one setting is at least one selected from the group consisting of a microphone beamforming setting, a display brightness setting, a power consumption setting, a content privacy setting, a login setting, and combinations thereof.

5. The method of claim 1, wherein the identifying comprises identifying one or more location characteristics associated with the location.

6. The method of claim 5, wherein the determining comprises determining whether at least one user-designated characteristic is present within the one or more location characteristics and wherein the adjusting comprising adjusting responsive to determining that the at least one current setting is inconsistent with the settings profile and that the at least one user-designated characteristic is present.

7. The method of claim 1, wherein the settings profile comprises a plurality of setting profiles and wherein each of the plurality of setting profiles corresponds to a unique user.

8. The method of claim 1, further comprising receiving, subsequent to the adjusting, modification input from a user for the adjusted at least one current setting.

9. An information handling device, comprising:
a processor;
a memory device that stores instructions executable by the processor to:
identify, based on context data, a location of the information handling device, wherein the location has a corresponding attribute;
access a settings profile for the information handling device that is based on the identified location, wherein at least a portion of the settings profile is dynamically established based upon historical user setting adjustment data for locations other than the identified location and analysis of the historical user setting adjustment data in view of the identified location, wherein dynamically establishing the at least a portion of the settings profile comprises identifying a user action has been performed a predetermined number of times at locations having the corresponding attribute other than the identified location;
determine whether at least one current setting on the information handling device is inconsistent with the settings profile; and
adjust, responsive to determining that the at least one current setting is inconsistent with the settings profile, the at least one current setting to match the settings profile for the location, wherein the adjusting comprises automatically adjusting without receipt of additional user input.

10. The information handling device of claim 9, wherein the instructions executable by the processor to identify the location comprise instructions executable by the processor to identify the location using at least one sensor selected from the group consisting of a camera sensor, a microphone, a receiver, and combinations thereof.

11. The information handling device of claim 9, wherein the context data is at least one article of data selected from the group consisting of image data, audio data, GPS data, calendar data communication data, and network data.

12. The information handling device of claim 9, wherein the at least one setting is at least one selected from the group consisting of a microphone beamforming setting, a display brightness setting, a power consumption setting, a content privacy setting, a login setting, and combinations thereof.

13. The information handling device of claim 9, wherein the instructions executable by the processor to identify comprise instructions executable by the processor to identify one or more location characteristics associated with the location.

14. The information handling device of claim 13, wherein the instructions executable by the processor to determine comprise instructions executable by the processor to determine whether at least one user-designated characteristic is present within the one or more location characteristics and wherein the instructions executable by the processor to adjust comprise instructions executable by the processor to adjust responsive to determining that the at least one current setting is inconsistent with the settings profile and that the at least one user-designated characteristic is present.

15. The information handling device of claim 9, wherein the instructions are further executable by the processor to receive, subsequent to the adjusting, modification input from a user for the adjusted at least one current setting.

16. A product, comprising:
non-transitory storage device medium that stores code, the code being executable by a processor and comprising:
code that identifies, based on context data, a location of an information handling device, wherein the location has a corresponding attribute;
code that accesses a setting profile for the information handling device that is based on the identified location, wherein at least a portion of the settings profile is dynamically established based upon historical user setting adjustment data for locations other than the identified location and analysis of the historical user setting adjustment data in view of the identified location, wherein dynamically establishing the at least a portion of the settings profile comprises identifying a user action has been performed a predetermined number of times at locations having the corresponding attribute other than the identified location;
code that determines whether at least one current setting on the information handling device is inconsistent with the settings profile; and
code that adjusts, responsive to determining that the at least one current setting is inconsistent with the settings profile, the at least one current setting to match the settings profile for the location, wherein the adjusting comprises automatically adjusting without receipt of additional user input.

* * * * *